United States Patent
Watson et al.

(10) Patent No.: US 11,210,592 B2
(45) Date of Patent: Dec. 28, 2021

(54) CROWD SOURCED MAINTENANCE SYSTEMS AND METHODS FOR TRANSPORTATION VEHICLES

(71) Applicant: Panasonic Avionics Corporation, Lake Forest, CA (US)

(72) Inventors: Philip Watson, Lake Forest, CA (US); Steven Bates, Missio Viejo, CA (US)

(73) Assignee: Panasonic Avionics Corporation, Lake Forest, CA (US)

( * ) Notice: Subject to any disclaimer, the term of this patent is extended or adjusted under 35 U.S.C. 154(b) by 445 days.

(21) Appl. No.: 16/449,260

(22) Filed: Jun. 21, 2019

(65) Prior Publication Data
US 2020/0401906 A1    Dec. 24, 2020

(51) Int. Cl.
| G06N 5/02 | (2006.01) |
| G06N 20/00 | (2019.01) |
| G07C 5/00 | (2006.01) |
| G07C 5/02 | (2006.01) |
| G07C 5/08 | (2006.01) |

(52) U.S. Cl.
CPC ............... *G06N 5/02* (2013.01); *G06N 20/00* (2019.01); *G07C 5/008* (2013.01); *G07C 5/02* (2013.01); *G07C 5/08* (2013.01)

(58) Field of Classification Search
CPC .......... G06N 5/02; G06N 20/00; G07C 5/008; G07C 5/02; G07C 5/08

USPC ........................................................ 701/31.4
See application file for complete search history.

(56) References Cited

U.S. PATENT DOCUMENTS

| 2014/0289306 A1 | 9/2014 | O'Sullivan et al. |
| 2015/0019049 A1 | 1/2015 | Kavounas |
| 2018/0053501 A1 | 2/2018 | Hilal et al. |
| 2018/0068332 A1 | 3/2018 | Kajak |
| 2020/0192366 A1* | 6/2020 | Levinson ............... G01S 13/865 |

FOREIGN PATENT DOCUMENTS

WO    WO2000/052550    9/2000

* cited by examiner

*Primary Examiner* — Gertrude Arthur Jeanglaude
(74) *Attorney, Agent, or Firm* — Klein, O'Neill & Singh, LLP

(57) ABSTRACT

Methods and systems are provided for communicating an announcement to passengers on a transportation vehicle. One method includes receiving by a first device, an input from a passenger of a transportation vehicle, the input reporting a problem at the transportation vehicle; transmitting the input by the first device to a second device; evaluating by the second device whether the problem identified by the input is to be resolved at the transportation vehicle; generating a response by the second device to address the problem, when the evaluation indicates that the problem can be resolved at the transportation vehicle; and updating a data structure by the second device for addressing the problem after the transportation vehicle has reached a destination, when the evaluation indicates that the problem cannot be resolved at the transportation vehicle.

20 Claims, 11 Drawing Sheets

CROWD SOURCED MAINTENANCE SYSTEMS AND METHODS FOR TRANSPORTATION VEHICLES

TECHNICAL FIELD

The present disclosure relates to transportation vehicles in general, and more particularly, to a crowd sourced maintenance system for transportation vehicles.

BACKGROUND

Transportation vehicles, for example, aircraft, trains, buses, recreation vehicle, boats and other similar vehicles use various computing devices for providing various functions, including entertainment, system control, content storage, and other functions. These computing devices include hardware (for example, servers, switches, network interface cards, storage adapters, storage devices and others) and software (for example, server applications, operating systems, firmware, management applications, application programming interface (APIs) and others).

Transportation vehicles today have individualized functional equipment dedicated to a particular passenger seat, which can be utilized by a passenger, such as adjustable seats, adjustable environmental controls, adjustable lighting, telephony systems, video and/or audio entertainment systems, crew communication systems, and the like. For example, many commercial airplanes have individualized video and audio entertainment systems, often referred to as "in-flight entertainment" or "IFE" systems.

It has become quite commonplace for travelers to carry personal electronic devices (PEDs) having wireless communication capability, such as cellular phones, smart phones, tablet computers, laptop computers, and other portable electronic devices. This includes passengers and crew traveling on all types of transportation including the vehicles of common carriers, such as airplanes, passenger trains, buses, cruise ships, sightseeing vehicles (e.g., ships, boats, buses, cars, etc.). Many of these personal electronic devices have the capability to execute application software programs ("apps") to perform various functions, including controlling other devices and systems.

As technology continues to develop for transportation vehicles, so does the need for efficiently maintaining those systems. In conventional systems today, when a passenger has to report a problem on a transportation vehicle, e.g., on an aircraft, the passenger interrupts a crew member and describes the problem or uses an "attendant call button". The passenger then waits for a response. The crew member must remember the details of the problem and then manually enter information regarding the problem in a cabin maintenance log, which may be an electronic or a manual log. The maintenance log is then provided to a centralized computing system that stores the information. Conventional systems are inefficient because they add extra manual work for crew members and are also reliant on a crew member's ability to remember problem details. Continuous efforts are being made to improve passenger experience, reduce crew member workload and better maintain transportation vehicle systems and devices.

BRIEF DESCRIPTION OF THE DRAWINGS

The various features of the present disclosure will now be described with reference to the drawings of the various aspects disclosed herein. In the drawings, the same components may have the same reference numerals. The illustrated aspects are intended to illustrate, but not to limit the present disclosure. The drawings include the following Figures.

DETAILED DESCRIPTION

Figure 1A:
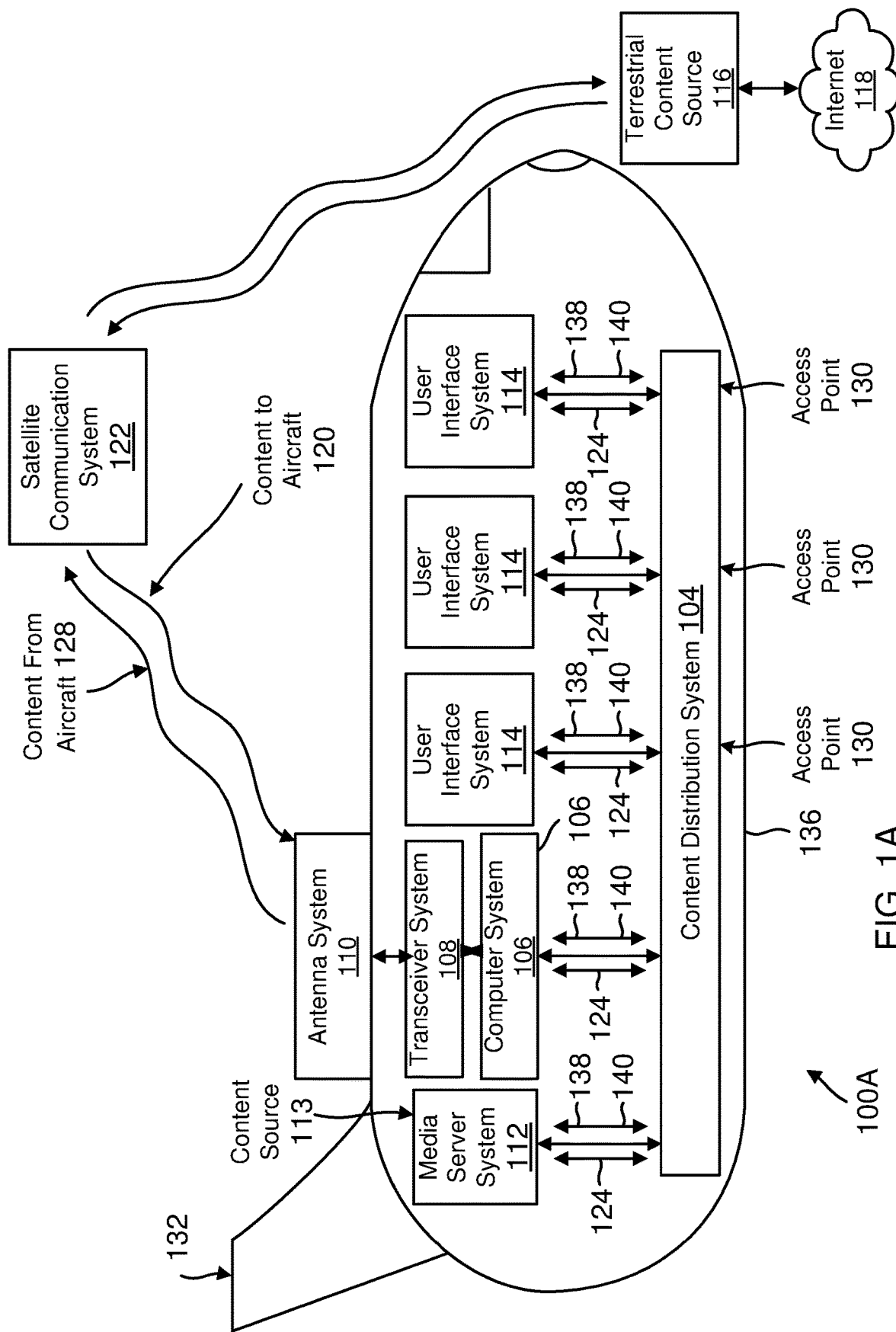
FIG. 1A shows an example of an operating environment for implementing the various aspects of the present disclosure on an aircraft.

As a preliminary note, the terms "component", "module", "system", and the like as used herein are intended to refer to a computer-related entity, either software-executing general purpose processor, hardware, firmware or a combination thereof. For example, a component may be, but is not limited to being, a process running on a hardware processor, a hardware processor, an object, an executable, a thread of execution, a program, and/or a computer.

By way of illustration, both an application running on a server and the server can be a component. One or more components may reside within a process and/or thread of execution, and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

Computer executable components can be stored, for example, on non-transitory, computer/machine readable media including, but not limited to, an ASIC (application specific integrated circuit), CD (compact disc), DVD (digital video disk), ROM (read only memory), hard disk, EEPROM (electrically erasable programmable read only memory), solid state memory device or any other storage device, in accordance with the claimed subject matter.

In one aspect, innovative computing technology is provided for receiving passenger input via an electronic device (for example, a PED, a seat device providing an In-Flight Entertainment System (IFE) or any other device type). The passenger input is aggregated and used to develop a training dataset for a machine learning system. The training dataset is updated overtime based on a plurality of inputs received from passengers.

In one aspect, the passenger input identifies a potential problem. The problem may be associated with a device (hardware, software or both, when applicable), or a seat function, for example, temperature may be too hot or too cold, water may be dripping from a ceiling, a seat may be jammed and may not move, a power plug may not be operational, Wi-Fi may not be functioning, a video on a seat device may have an incorrect language setting, a personal item may have fallen or other problem. It is noteworthy that the various aspects of the present disclosure are not limited to any specific problem.

In one aspect, based on the training dataset, for certain problems, the technology disclosed herein provides an explanation on the aircraft to alleviate passenger concerns, for example, water from the ceiling is regular condensation from the air conditioning, Wi-Fi and seat power will begin working after take-off. In other circumstances, the system provides a solution on the aircraft, e.g., if the passenger is too cold, a blanket may be offered.

In one aspect, the passenger input includes the passenger seat location identifying the passenger and the passenger status (e.g., frequent flyer status). This information may be used to prioritize resolution of passenger reported problem.

In one aspect, the passenger input in conjunction with the training dataset is used to develop corrective action. For example, if there is a report about a video title being improper, the system would alert a crew member to preview the title and potentially disable it. If after a certain number of reports (e.g., five reports) regarding the Wi-FI not working, the system alerts the crew to reset the Wifi system. If there are a certain number of reports regarding a seat not operating properly, the system notifies the crew to not seat anyone at the identified seat. The corrective action can be preventive in nature or prescriptive, as described below in detail. In another aspect, a predictive response/alert is generated based on passenger input. Details regarding the innovative computing technology is provided below.

Vehicle Information System: FIG. 1A shows an example of a generic vehicle information system 100A (also referred to as system 100A) that can be configured for installation aboard an aircraft 132, according to one aspect of the present disclosure. In one aspect, as described below in detail, system 100A provides an interface for collecting crowd-sourced reports of problems within an aircraft. Based on the crowd-sourced reports, a machine learning module (386, FIG. 3C) may provide a predictive, preventive or prescriptive response associated with a specific report. Details regarding the machine learning module are provided below.

When installed on an aircraft, system 100A can comprise an aircraft passenger IFE system, such as the Series 2000, 3000, eFX, eX2, eXW, eX3, NEXT, and/or any other in-flight entertainment system developed and provided by Panasonic Avionics Corporation (without derogation of any trademark rights of Panasonic Avionics Corporation) of Lake Forest, Calif., the assignee of this application.

System 100A comprises at least one content source 113 and one or more user (or passenger) interface systems (may also be referred to as a seat device/seatback device) 114 that communicate with a real-time content distribution system 104. The content sources 113 may include one or more internal content sources, such as a media server system 112, that are installed aboard the aircraft 132, one or more remote (or terrestrial) content sources 116 that can be external from the aircraft 132, or a distributed content system. The media server system 112 can be provided as an information system controller for providing overall system control functions for system 100A and/or for storing viewing content 124, including pre-programmed viewing content and/or content 120 downloaded to the aircraft, as desired. The viewing content 124 can include television programming content, music content, podcast content, photograph album content, audio-book content, and/or movie content without limitation. The viewing content as shown and described herein are not exhaustive and are provided herein for purposes of illustration only and not for purposes of limitation.

The server system 112 can include, and/or communicate with, one or more conventional peripheral media storage systems (not shown), including optical media devices, such as a digital video disk (DVD) system or a compact disk (CD) system, and/or magnetic media systems, such as a video cassette recorder (VCR) system, a solid state drive (SSD) system, or a hard disk drive (HDD) system, of any suitable kind, for storing the preprogrammed content and/or the downloaded content 120.

The viewing content 124 can comprise any conventional type of audio and/or video viewing content, such as stored (or time-delayed) viewing content and/or live (or real-time) viewing content. As desired, the viewing content 124 can include geographical information. Alternatively, and/or additionally, to entertainment content, such as live satellite television programming and/or live satellite radio programming, the viewing content likewise can include two-way communications, such as real-time access to the Internet 118 and/or telecommunications.

Being configured to distribute and/or present the viewing content 124 provided by one or more selected content sources 113, system 100A can communicate with the content sources 113 in real time and in any conventional manner, including via wired and/or wireless communications. System 100A and the terrestrial content source 116, for example, can communicate directly and/or indirectly via an intermediate communication system, such as a satellite communication system 122.

System 100A can receive content 120 from a selected terrestrial content source 116 and/or transmit (upload) content 128, including navigation and other control instructions, to the terrestrial content source 116. As desired, the terrestrial content source 116 can be configured to communicate with other terrestrial content sources (not shown). The terrestrial content source 116 is shown as providing access to the Internet 118. Although shown and described as comprising the satellite communication system 122 for purposes of illustration, the communication system can comprise any conventional type of wireless communication system, such as a cellular communication system (not shown) and/or an Aircraft Ground Information System (AGIS) communication system (not shown).

To facilitate communications with the terrestrial content sources 116, system 100A may also include an antenna system 110 and a transceiver system 108 for receiving the viewing content from the remote (or terrestrial) content sources 116. The antenna system 110 preferably is disposed outside, such as an exterior surface of a fuselage 136 of the aircraft 132. The antenna system 110 can receive viewing content 124 from the terrestrial content source 116 and provide the received viewing content 124, as processed by the transceiver system 108, to a computer system 106 of system 100A. The computer system 106 can provide the received viewing content 124 to the media (or content) server system 112 and/or directly to one or more of the user interfaces 114 including a PED, as desired. Although shown and described as being separate systems for purposes of illustration, the computer system 106 and the media server system 112 can be at least partially integrated.

The user interface system 114 may be computing terminals in communication with an access point 130. The user interface system 114 provides a display device to view content. The user interface system 114 includes a hardware interface to connect to an access point 130 that provides a wired and/or a wireless connection for the user interface system.

In at least one embodiment, the user interface system 114 comprises a software application that a user downloads and installs on a personal electronic device (PED) to receive and view content via an access point 130, described below in detail. While bandwidth limitation issues may occur in a wired system on a vehicle, such as an aircraft 132, in general the wired portion of the vehicle information 100A system is designed with sufficient bandwidth to support all users aboard the vehicle, i.e., passengers.

The user interface system 114 can include an input system (not shown) for permitting the user (or passenger) to communicate with system 100A, such as via an exchange of control signals 138. For example, the input system can permit the user to report any problems with the IFE system or any other seat function, input one or more user instructions 140 for controlling the operation of system 100A. Illustrative user instructions 140 can include instructions for initiating communication with the content source 113, instructions for selecting viewing content 124 for presentation, and/or instructions for controlling the presentation of the selected viewing content 124. If a fee is required for accessing the viewing content 124 or for any other reason, payment information likewise can be entered via the input system. The input system can be provided in any conventional manner and typically includes a touch screen, application programming interface (API) for uploading a video for reporting a problem, a microphone for voice input to report a specific problem, one or more switches (or pushbuttons), such as a keyboard or a keypad, and/or a pointing device, such as a mouse, trackball, or stylus.

In one aspect, the user interface system 114 is provided at individual passenger seats of aircraft 132. The user interface system 114 can be adapted to different aircraft and seating arrangements and the adaptive aspects described herein are not limited to any specific seat arrangements or user interface types.

Figure 1B:
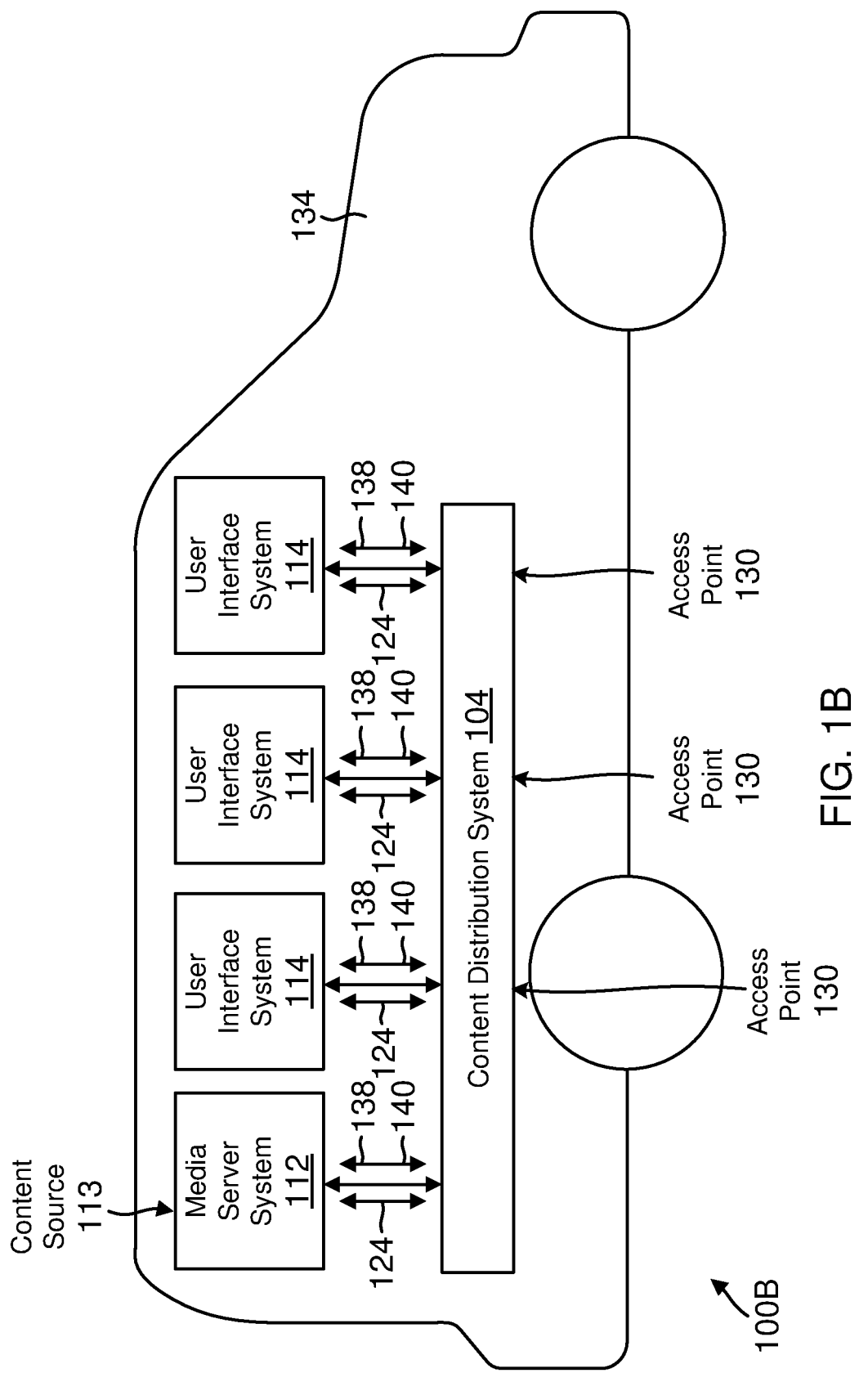
FIG. 1B shows an example of the operating environment on a non-aircraft transportation vehicle type, according to one aspect of the present disclosure.

FIG. 1B shows an example of implementing the vehicle information system 100B (may be referred to as system 100B) on an automobile 134 that may include a bus, a recreational vehicle, a boat, and/or a train, or any other type of passenger vehicle without limitation. The various components of system 100B may be similar to the components of system 100A described above with respect to FIG. 1A and for brevity are not described again.

Figure 2:
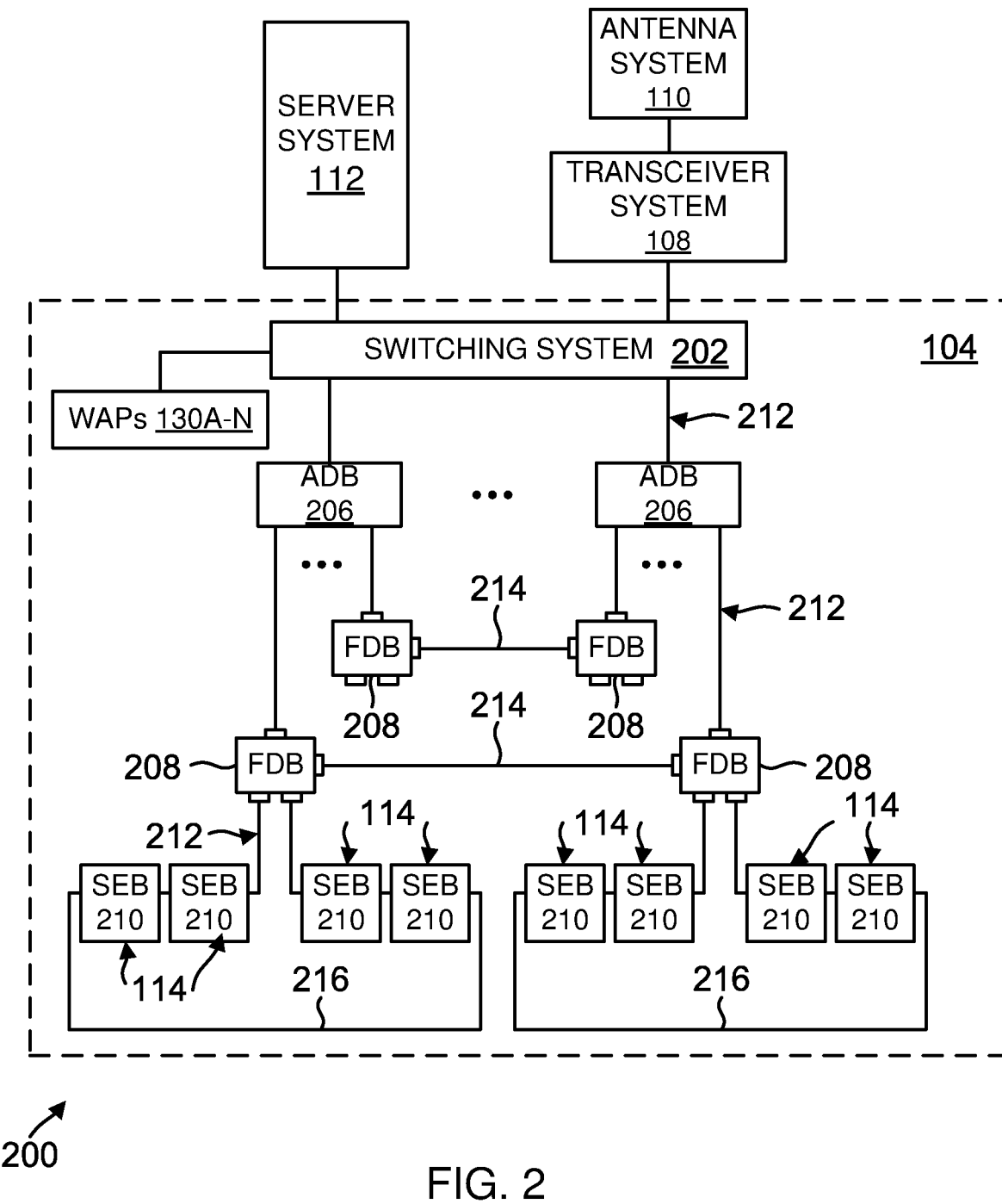
FIG. 2 shows an example of a content distribution system, used according to one aspect of the present disclosure.

Content Distribution System: FIG. 2 illustrates an example of the content distribution system 104 for the vehicle information system 200 (similar to 100A/100B), according to one aspect of the present disclosure. The content distribution system 104 couples, and supports communication between the server system 112, and the plurality of user interface systems 114.

The content distribution system 104, for example, can be provided as a conventional wired and/or wireless communication network, including a telephone network, a local area network (LAN), a wide area network (WAN), a campus area network (CAN), personal area network (PAN) and/or a wireless local area network (WLAN) of any kind. Exemplary wireless local area networks include wireless fidelity (Wi-Fi) networks in accordance with Institute of Electrical and Electronics Engineers (IEEE) Standard 802.11 and/or wireless metropolitan-area networks (MANs), which also are known as WiMax Wireless Broadband, in accordance with IEEE Standard 802.16.

Preferably being configured to support high data transfer rates, the content distribution system 104 may comprise a high-speed Ethernet network, such as any type of Fast Ethernet (such as 100 Base-X and/or 100 Base-T) communication network and/or Gigabit (such as 1000 Base-X and/or 1000 Base-T) Ethernet communication network, with a typical data transfer rate of at least approximately one hundred megabits per second (100 Mbps) or any other transfer rate. To achieve high data transfer rates in a wireless communications environment, free-space optics (or laser) technology, millimeter wave (or microwave) technology, and/or Ultra-Wideband (UWB) technology can be utilized to support communications among the various system resources, as desired.

As illustrated in FIG. 2, the distribution system 104 can be provided as a plurality of area distribution boxes (ADBs) 206, a plurality of floor disconnect boxes (FDBs) 208, and a plurality of seat electronics boxes (SEBs) (and/or video seat electronics boxes (VSEBs) and/or premium seat electronics boxes (PSEBs)) 210 being configured to communicate in real time via a plurality of wired and/or wireless communication connections 212.

The distribution system 104 likewise can include a switching system 202 for providing an interface between the distribution system 104 and the server system 112. The switching system 202 can comprise a conventional switching system, such as an Ethernet switching system, and is configured to couple the server system 112 with the area distribution boxes 206. Each of the area distribution boxes 206 is coupled with, and communicates with, the switching system 202. In addition, the distribution system 104 includes one or more wireless access points (WAPs) (130A to 130N) connected in communication with the switch system 202 for wireless distribution of content to user interface systems 114 including PEDs.

Each of the area distribution boxes 202, in turn, is coupled with, and communicates with, at least one floor disconnect box 208. Although the area distribution boxes 206 and the associated floor disconnect boxes 208 can be coupled in any conventional configuration, the associated floor disconnect boxes 208 preferably are disposed in a star network topology about a central area distribution box 206 as illustrated in FIG. 2. Each floor disconnect box 208 is coupled with, and services, a plurality of daisy-chains of seat electronics boxes 210. The seat electronics boxes 210, in turn, are configured to communicate with the user interface systems 114. Each seat electronics box 210 can support one or more of the user interface systems 114.

The switching systems 202, the area distribution boxes 206, the floor disconnect boxes 208, the seat electronics boxes (and/or video seat electronics boxes (VSEBs) and/or premium seat electronics boxes (PSEBs)) 210, the antenna system 110, the transceiver system 108, the content source 113, the server system 112, and other system resources of the vehicle information system preferably are provided as line replaceable units (LRUs). The use of LRUs facilitate maintenance of the vehicle information system 200 because a defective LRU can simply be removed from the vehicle information system 200 and replaced with a new (or different) LRU. The defective LRU thereafter can be repaired for subsequent installation. Advantageously, the use of LRUs can promote flexibility in configuring the content distribution system 104 by permitting ready modification of the number, arrangement, and/or configuration of the system resources of the content distribution system 104. The content distribution system 104 likewise can be readily upgraded by replacing any obsolete LRUs with new LRUs.

The distribution system 104 can include at least one FDB internal port bypass connection 214 and/or at least one SEB loopback connection 216. Each FDB internal port bypass connection 214 is a communication connection 212 that permits floor disconnect boxes 208 associated with different area distribution boxes 206 to directly communicate. Each SEB loopback connection 216 is a communication connection 212 that directly couples the last seat electronics box 210 in each daisy-chain of seat electronics boxes 210 for a selected floor disconnect box 208 as shown in FIG. 2. Each SEB loopback connection 216 therefore forms a loopback path among the daisy-chained seat electronics boxes 210 coupled with the relevant floor disconnect box 208.

It is noteworthy that the various aspects of the present disclosure may be implemented without using FDB 208. When FDB 208 is not used, ADB 206 communicates directly with SEB 210 and/or server system 112 may communicate directly with SEB 210 or the seats. The various aspects of the present disclosure are not limited to any specific network configuration.

Figure 3A:
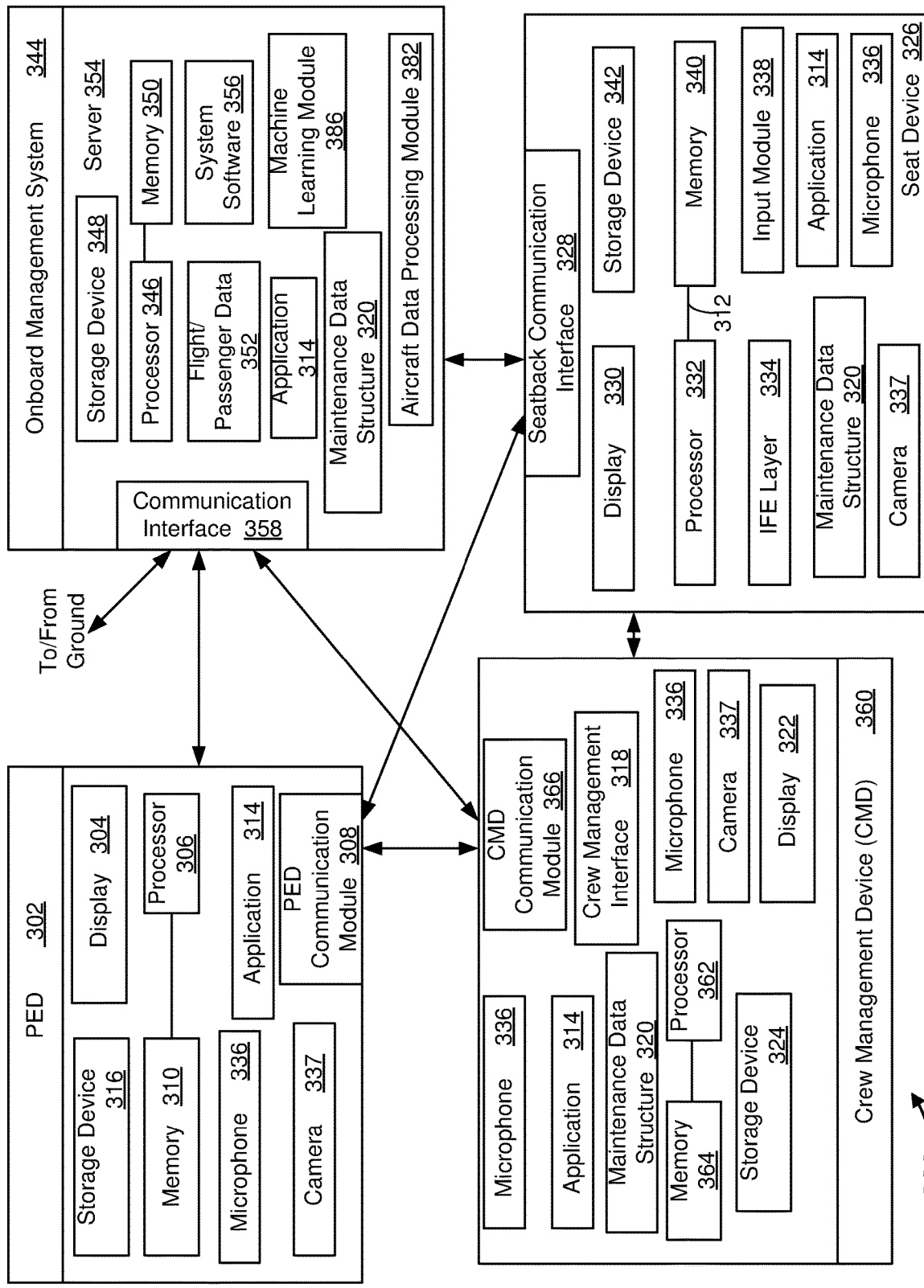
FIG. 3A shows an example of an overall system for distributing information to passengers on an aircraft, according to one aspect of the present disclosure.

System 300: FIG. 3A shows an example of a system 300 having a processor executed application 314 for receiving user input to report problems within an aircraft (or any other transportation vehicle), according to one aspect of the present disclosure. Application 314 provides an interface for a passenger to report one or more problems. The interface is configured to receive text, video and/or audio input from the passenger. The passenger input may identify a specific problem with a specific device or a generic problem. The innovative technology disclosed herein uses crowd sourced, machine-learned data to provide a predictive, preventive or a prescriptive response, as described below in detail.

In one aspect, system 300 includes, a PED 302, an onboard management system 344, a seat device 326, and a crew management device (may be referred to as "CMD") 360. In another aspect, system 300 may not include a seat device 326. The onboard management system 344 may be similar to computer system 106 and/or server 112 described above with respect to FIGS. 1A/1B.

In one aspect, PED 302 may be a mobile phone, a notebook, a tablet, a laptop or any other computing device. PED 302 may include a processor 306 that has access to a memory 310 via a bus system/interconnect (similar to 312) for executing stored instructions. The bus system may represent any one or more separate physical buses and/or point-to-point connections, connected by appropriate bridges, adapters and/or controllers. The bus system may include, for example, a system bus, a Peripheral Component Interconnect (PCI) bus, a PCI-Express bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire") or any other interconnect type.

Processor 306 may be, or may include, one or more programmable, hardware based, general-purpose or special-purpose microprocessors, digital signal processors (DSPs), programmable controllers, application specific integrated circuits (ASICs), programmable logic devices (PLDs), or the like, or a combination of such hardware devices.

PEDs 302 may also include a microphone 336 for receiving a voice input from a passenger to report a problem, according to one aspect of the present disclosure. The voice input is converted into text by application 314 for processing. In another aspect, PED 302 includes a camera 337 that may be used by a passenger to upload a video providing a visual representation of a problem.

The PED 302 includes a storage device 316 that may be, or may include any storage medium for storing data in a non-volatile manner, such as one or more magnetic or optical based disks, flash memory, or solid-state drive. The storage device 316 may be used to store content displayed on a display 304 of PED 302 when used by a passenger. In one aspect, display 304 may include a touch screen for receiving input commands. In another aspect, display 304 may be used by a passenger to report a problem as well as to display text messages from crew members, when applicable.

The storage device 316 may also store the application 314 that is executed out of memory 310. Application 314 may be used to pair the PED 302 with the aircraft systems to receive content and communicate with aircraft crew. Application 314 may provide an interface to a passenger to report a problem. The interface is configured to receive text, voice or video input, as described below in detail.

As an example, application 314 may be made available for download and installation via a public repository such as that maintained respectively under the trademark GOOGLE PLAY by Google, Inc. and/or the APP STORE maintained by Apple Inc. In addition, application 314 may be provided for download by an airline carrier on a website or from the onboard management system 344.

In one aspect, PED 302 uses a PED communication module 308 to communicate with the seat device 326, when installed. In one aspect, PED communication module 308 may include one or more interfaces to communicate with different devices, including Wi-Fi interface, Bluetooth interface, NFC (Near Field Communication) interface and others. The adaptive aspects described herein are not limited to any specific interface. It is noteworthy that although a single block is shown for the PED communication module 308 for convenience, the communication module may have different interface, cards, logic and circuitry to comply with the different communication protocols/standards.

In one aspect, the seat device 326 includes a display device 330, a processor 332, a memory 340, a communication interface 328 and a local storage device 342 for storing content. The seat device 326 receives user input/requests via an input module 338. The input module 338 may be configured to use a local touch screen included with display 330, a local virtual keyboard, an external mouse, external keyboard or any other input device. The input module 338 may be used by a passenger to report a problem within the aircraft. The seat device 326 may store a copy of a machine learned, maintenance data structure 320 (may be referred to as data structure 320 or machine learned model 320) or a portion thereof, for providing a response to the passenger reporting the problem. The response will be based on the problem type. Details regarding data structure 320 are provided below. The various adaptive aspects described herein are not limited to any specific input device.

Processor 332 has access to memory 340 via an interconnect 312. Processor 332 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

The bus system 312 is an abstraction that represents any one or more separate physical buses and/or point-to-point connections, connected by appropriate bridges, adapters and/or controllers. The bus system 312, therefore, may include, for example, a system bus, a Peripheral Component Interconnect (PCI) bus, a PCI-Express bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire") or any other interconnect type.

In one aspect, processor 332 executes an IFE layer 334 that provides in-flight entertainment and other options to users. The IFE layer 334 provides audio/video content as well as controls for accessing the content. The IFE layer 334 uses the communication interface 328 to interface with the PED 302 and/or onboard management system 344. The communication interface 328 includes logic and circuitry for interfacing with the onboard management system 344 and/or PED 302. In one aspect, the communication interface 328 may use a wireless and/or wired connection for such communication.

In another aspect, the seat device 326 executes the application 314 that may be used by the passenger to report a problem, either via microphone 336, camera 337 or by text. Application 314 may also be used by passengers for reporting problems directly to a crew member at CMD 360. The application 314 when executed by the seat device 326 may have different functionality compared to when application 314 is executed by the PED 302.

The seat device 326 on the aircraft may be part of the user interface system 114 or interfaces with the user interface system 114 also described above with respect to FIGS. 1A/1B. It is noteworthy that the seat device 326 need not be mounted on the back of a seat and may be supported from other structures, such as a bulkhead, wall, arm of a seat, etc. The adaptive aspects of the present disclosure are not limited to any specific location or orientation of the seat device 326.

In one aspect, the onboard management system 344 includes a server 354 (similar to the media server 112 and/or computer system 106). The server 354 includes a processor 346 that has access to a memory 350 via a bus system/interconnect (similar to 312). The bus system may represent any one or more separate physical buses and/or point-to-point connections, connected by appropriate bridges, adapters and/or controllers. The bus system may include, for example, a system bus, a Peripheral Component Interconnect (PCI) bus, a PCI-Express bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire") or any other interconnect type.

Processor 346 may be, or may include, one or more programmable, hardware-based, general-purpose or special-purpose microprocessors, digital signal processors (DSPs), programmable controllers, application specific integrated circuits (ASICs), programmable logic devices (PLDs), or the like, or a combination of such devices.

Processor 346 has access to a storage device 348 that may be used to store data (for example, passenger data 352, data structure 320 or a portion thereof, and other information) applications and program files, including system software 356, application 314, machine learning module 386 (may also be referred to as module 386) and others.

System software 356 of the onboard management system 344 is executed by the processor 346 to control the overall operation of the server 354 including monitoring the status of network connections to ground systems. Application 314 may be downloaded by passengers using an authorized PED 302 for accessing digital content as well as to report problems.

In one aspect, the onboard management system 344 maintains flight and passenger data 352, for example, flight itinerary including origin location, layover locations, destination location, language preference for translating messages from one language to another, arrival time and other information. Data 352 may also include passenger data that identifies each passenger for a flight, a seat assigned to a passenger, a language preference for the passenger, and any other information that can uniquely identify the passengers. Data 352 may be retrieved from an airline ground system (not shown) before flight departure and may be updated during flight.

In one aspect, server 354 communicates with CMD 360, PED 302 and/or seat device 326 via a communication interface 358. The communication interface 358 may also be used to receive information from the ground, for example, data 352 and other information. The communication interface 358 includes one or more interfaces for a wired and/or wireless connection, as described above with respect to FIGS. 1A/1B and 2.

In another aspect, server 344 executes module 386 and an aircraft data processing module 382 (may also be referred to as module 382) for generating data structure 320 or a portion thereof. Details regarding module 386 are provided below with respect to FIG. 3C.

In one aspect, CMD 360 may be a mobile phone, a notebook, a tablet, a laptop or any other similar device. CMD 360 may include a processor 362 that has access to a memory 364 via a bus system/interconnect (similar to 312) for executing stored instructions. The bus system may represent any one or more separate physical buses and/or point-to-point connections, connected by appropriate bridges, adapters and/or controllers. The bus system may include, for example, a system bus, a Peripheral Component Interconnect (PCI) bus, a PCI-Express bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire") or any other interconnect type.

Processor 362 may be, or may include, one or more programmable, hardware based, general-purpose or special-purpose microprocessors, digital signal processors (DSPs), programmable controllers, application specific integrated circuits (ASICs), programmable logic devices (PLDs), or the like, or a combination of such hardware devices.

CMD 360 typically includes a microphone 336 for receiving a voice input, according to one aspect of the present disclosure.

In one aspect, CMD 360 includes a display 322 to display information. Display 322 may also include a touch screen for receiving input commands. Display 322 may also be used to receive messages from passengers including when a passenger is reporting problems.

The CMD 360 includes a storage device 324 that may be, or may include any storage medium for storing data in a non-volatile manner, such as one or more magnetic or optical based disks, flash memory, or solid-state drive. The storage device 316 may be used to store a crew management interface (CMI) 318 that may be executed out of memory 364. The storage device 316 may also be used to store the data structure 320 or a portion thereof for providing a response to a passenger reporting a problem.

The CMI 318 enables the CMD 360 to interface with the onboard management system 344 via a CMD communication module 366. The CMD 360 may present one or more APIs to the management system 344 to retrieve passenger/flight data and update data structure 320. The non-limiting API format and syntax will depend on the protocols used by the CMD 360 and the onboard management system 344.

In one aspect, the CMD communication module 366 is also used to communicate with the seat device 326, when installed, and one or more PEDs 302. In one aspect, the CMD communication module 366 may include one or more interfaces to communicate with different devices, including Wi-Fi interface, Bluetooth interface, NFC (Near Field Communication) interface and others. The adaptive aspects described herein are not limited to any specific interface. It is noteworthy that although a single block is shown for the CMD communication module 366 for convenience, the communication module may have different interface, cards, logic and circuitry to comply with the different communication protocols/standards.

Figure 3B:
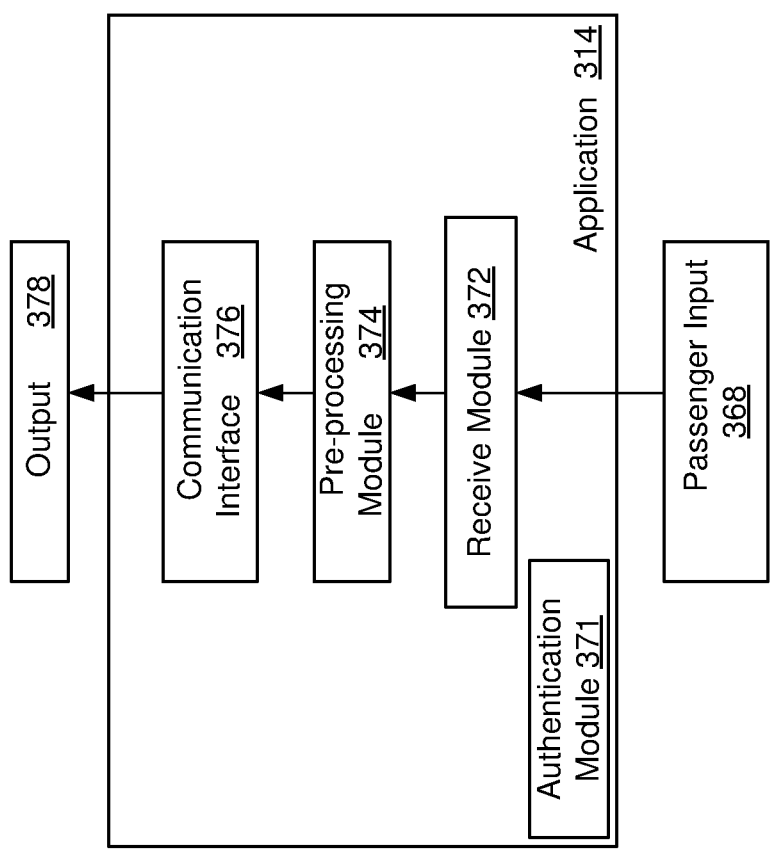
FIG. 3B shows a block diagram of an application, according to one aspect of the present disclosure.

Application 314: FIG. 3B shows an example of application 314, according to one aspect of the present disclosure. In one aspect, application 314 is executed out of PED 302. However, application 314 may also be executed from seat device 326.

In one aspect, application 314 includes an authentication module 371 that authenticates the PED 302 for pairing the PED 302 with the IFE layer 334. This enables the PED 302 to communicate with the seat device 326. The authentication may be based on using a password, biometrics or any other technique.

In one aspect, application 314 includes a receive module 372 that receives passenger input 368. The passenger input may be a video from the camera 337 of PED 302, an audio file from the microphone 336 or text. The passenger input 368 provides information related to a problem. The receive module 372 provides the passenger input 368 to a pre-processing module 374.

The pre-processing module 374 pre-processes the input. The pre-processing is based on the type of input. For example, if the input is provided as text, then the pre-processing module 374 extracts the information from the text and provides that to a communication interface 376 that generates an output 378. If the input is an audio input, then the re-processing module 374 converts the audio into text using a speech to text converter (not shown). If the input is a video, the information from the video is extracted by the pre-processing module 374. It is noteworthy that the pre-processing module 374 may also include a translation sub-module that translates the input from a first language to a second language. The translation maybe performed by using a translation package.

Figure 3C:
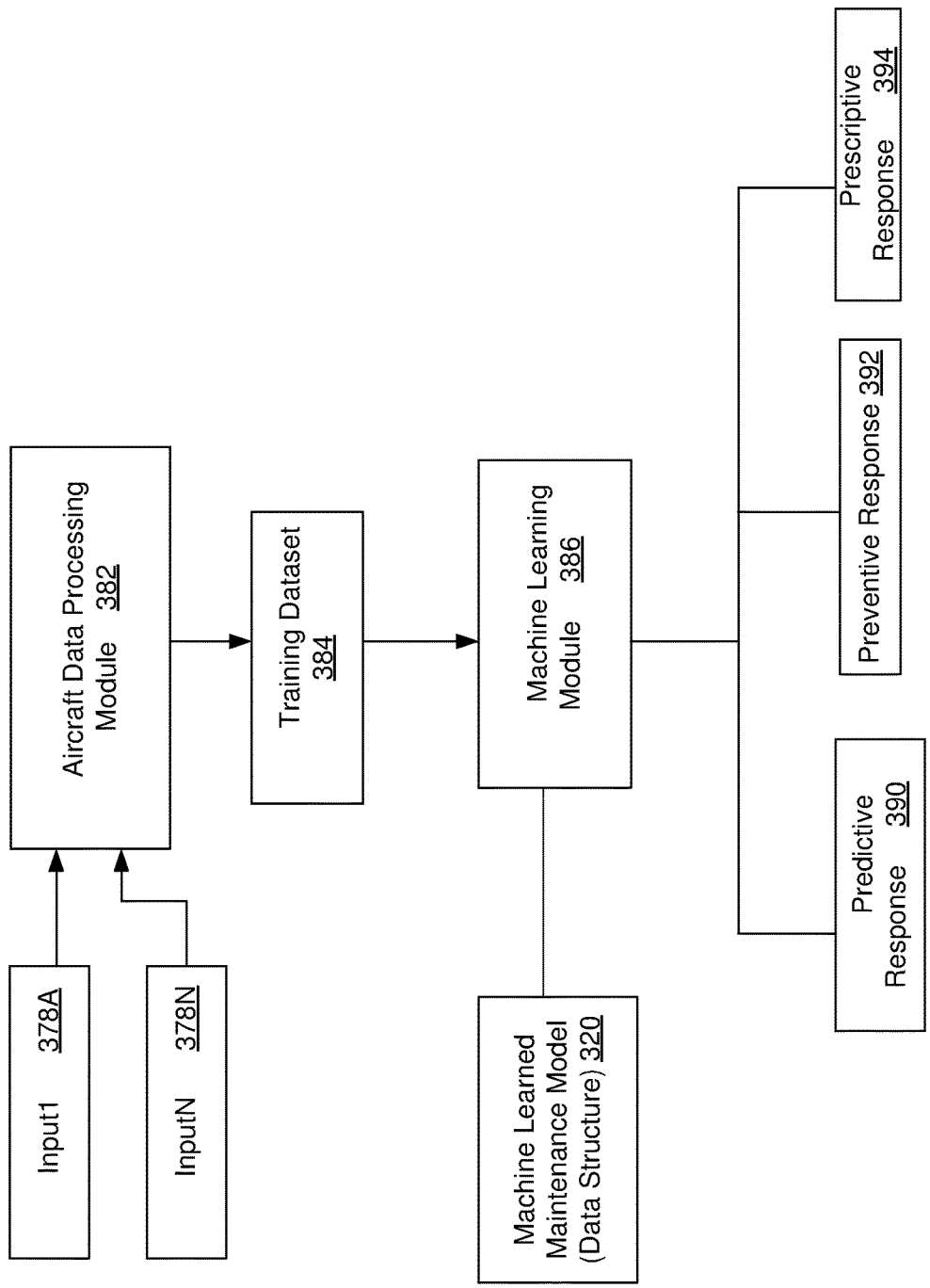
FIG. 3C shows a block diagram of a machine learning system, according to one aspect of the present disclosure.

The output 378 from application 314 is provided to module 386 that is now described with respect to FIG. 3C.

Machine Learning Module 386: The machine learning module 386 includes processor executable code for maintaining and updating the data structure 320, as described below in detail. In one aspect, passenger reported problems are provided as inputs 378A-378N to module 382. Module 382 may be executed on the aircraft or at a ground based system. In one aspect, module 382 is executed by server 354, seat device 326 and/or CMD 360. Module 382 extracts a plurality of parameters from the passenger reported inputs. The parameters may include a description of the problem, a seat location associated with a problem, an aircraft type, device identification (when applicable) for a device associated with the problem, device type, device age, a rating value that rates the severity of the problem, a rating for a passenger that reported the problem, where the passenger rating may indicate a passenger type, notations if any from the crew members, or any other information.

In one aspect, passenger reports problems to module 382 through, for example, an In-Flight Entertainment System (IFE), or Personal Electronic Device (PED), that are outside and/or inside of the aircraft. For example, if a passenger observes a problem outside of the aircraft before entering, e.g., fuel leaking from an aircraft on the runway, flat or low air on tires on the aircraft, a hole in side of the aircraft, wing/fuselage is damaged on the aircraft, water on pedestrian path or the runway, window appears cracked on the aircraft, or the like, then the passenger can send a message on their PED or through the IFE to an aircraft maintenance reporting center, e.g., crew terminal of the aircraft, for review and/or scheduling repair/maintenance and/or appropriate corrective action by an appropriate maintenance crew team.

In another aspect, if a passenger observes a problem inside of the aircraft while walking to their seat, e.g., dirty carpet, fuel smell coming through cabin door, a monitor knob missing on the passenger's seatback monitor or another seatback monitor, aircraft smells, flight attendant rude, toilet blocked in lavatory, no toilet paper, toilet not flushing, water running in the lavatory, lavatory door is locked/broken, then the passenger can send a message on their PED or through the IFE to an aircraft maintenance/customer service reporting center, e.g., crew terminal of the aircraft, for review and/or scheduling repair/maintenance and/or appropriate corrective action by an appropriate maintenance crew team.

In one aspect, module 382 generates a training dataset 384 for module 386 that maintains and updates data structure 320. The data structure 320 is configured to store information regarding the various problems, including successful and unsuccessful resolutions. Module 386 uses the crowd sourced inputs 378 to regularly update data structure 320 for efficiently maintaining the different systems and devices of the aircraft.

In one aspect, data structure 320 categorizes different problem types into objects, where each object has multiple attributes. The attributes values may identify the different aspects of a problem and intended solutions. In one instance, if the passenger has familiarity with the problem, e.g., special skills (special training), then the problem can be marked for immediate attention/shortening diagnosis time. For instance, if the passenger is an off-duty pilot and notices a problem that a passenger seat is non-functional, then the priority of the message sent to Module 386 can be marked for high priority (e.g., immediate attention) to the crew terminal to find an appropriate maintenance personnel to fix. In another instance, if the passenger is a plumber and notices the toilet is non-operation or water flooding the cabin, then the message from this passenger can be marked for high priority (e.g., immediate attention) by the crew terminal to find an appropriate maintenance personnel to fix.

In another example, a list of items (list of problems) for attention can be generated and prioritized on how to be handled, e.g., collective problem brainstorming/problem solving by both on and off ground maintenance crew members to determine if and when problem solution should be scheduled, e.g., immediately, later, next stop, future, and who or what crew does the repair, the maintenance, or the component change request. In some instances, the solutions may be predictive, preventative or prescriptive.

In one aspect, module 386 using training dataset 384 and data structure 320 provides a plurality of responses, including a predictive response 390, a preventive response 392 and a prescriptive response 394. The predictive response 390 predicts failure of a specific device or system. This can be used to alert maintenance as well as reservation system. The preventive response 392 is generated with guidelines to perform certain tasks to avoid future failure. The prescriptive response 394 directly addresses the immediate nature of the problem.

The various responses are generated by executing one or more machine learning algorithms, for example, Random Forests, Linear regression, Logistic regression, Linear discriminant analysis, Decision trees, Naïve Bayes, K-Nearest Neighbors Learning Vector Quantization, Support Vector Machines and others. The adaptive aspects of the present disclosure are not limited to any specific technique.

In one aspect, module 386 is executed primarily by a computing device that is on the ground. In another aspect, module 386 may be executed by server 354, while in yet another aspect, module 386 may partially be executed by a ground computing device and partially on the aircraft. In another aspect, module 386 may be executed in a distributed, cluster environment (e.g., a Hadoop cluster).

Figure 4A:
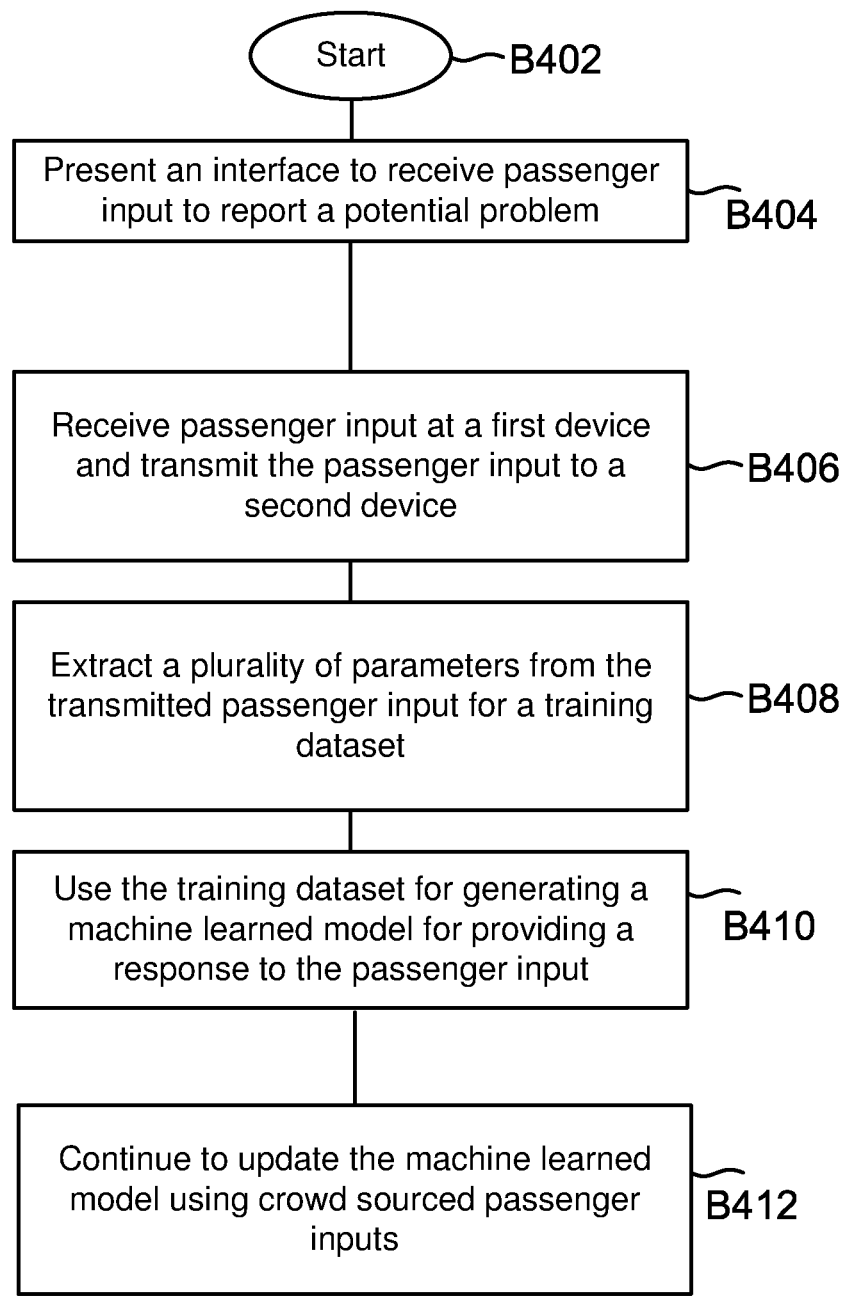
FIG. 4A shows a process flow diagram for generating a machine learning model for maintaining systems and devices of a transportation vehicle, according to one aspect of the present disclosure.

Process Flow: FIG. 4A shows a process 400 according to one aspect of the present disclosure. The process begins in block B402, when PED 302, server 354 and/or seat device 326 are initialized. In block B404, an interface is made available to a passenger for enabling the passenger to report any problems. In one aspect, the interface may be presented via application 314 on display 304 of PED 302 or at display 330 of seat device 330, when available. In one aspect, the interface is configured to receive an audio input, a video input and/or text. In another aspect, the interface may present a default list of selectable problems with certain common problems, e.g., temperature is too hot or cold, water is dripping from the ceiling, seat is not moving, power plug is not operational, Wi-Fi is not working, video display has a wrong language, or any other problem. This makes it easier for a passenger to report a perceived problem.

In block B406, passenger input at the interface is received at a first device (e.g., PED 302 or seat device 326). The received passenger input is then transmitted to a second device, for example, server 354, seat device 326 and/or CMD 360.

In block B408, a plurality of parameters are extracted from the passenger input for the training dataset 384 (FIG. 3C) by module 382.

In block B410, module 386 generates a machine learned model shown as data structure 320 for providing a response to the passenger input. As described above, the response can be predictive, preventive and prescriptive. Thereafter, in block B412, data structure 320 is updated based on crowd sourced passenger inputs.

Figure 4B:
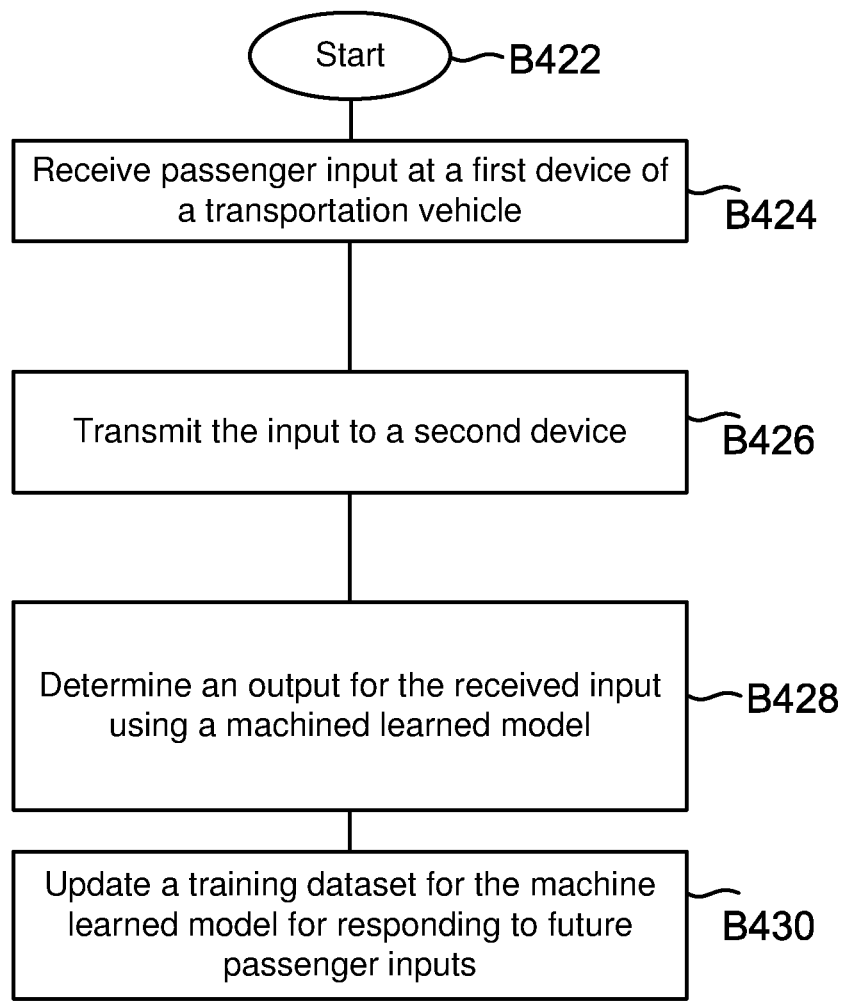
FIG. 4B shows a process flow diagram for using a machine learning model for maintaining systems and devices of a transportation vehicle, according to one aspect of the present disclosure.

FIG. 4B shows a process 420 for using the data structure 320 and module 386 for efficiently managing passenger reported problems. Process B422 begins in block B422, when PED 302, seat device 326, and server 354 are initialized and operational. In block B424, a passenger input is received at a first device (e.g., PED 302 or seat device 326). In block B426, the received input is communicated to a second device.

In block B428, an output/response to the input is determined based on data structure 320. As mentioned above, the output may be a predictive, preventive or prescriptive response. In one aspect, for some common issues, the output provides an explanation to alleviate passenger concerns. For example, the output may indicate that "water from a ceiling is normal condensation", "seat power/WiFi will begin operation after take-off" or any other explanation. For other problem types, the output may provide a solution, for example, when the reported problem is "too cold", the output may provide an option to the passenger to request a blanket.

In one aspect, a seat location is captured in the passenger input. Based on that passenger information is obtained from passenger data 352. This information is used to prioritize the response to the passenger input.

In another aspect, the output of block B428 may be based on a rule set that is derived from data structure 320 and provided to the server 354 and/or seat device 326/CMD 360. The rule set defines threshold and alert levels for different problem types. For example, if there is a report of a video tile, then a crew member is notified to preview the title before the flight. If an X number of reports are received that the Wi-Fi system is not working, an alert is sent to reset the Wi-Fi system. If a seat is not operating properly then an alert is sent to the crew and/or the seat reservation computing system to ensure that the seat is not assigned to another passenger for a next flight.

In block B430, the training dataset 378 and subsequently the data structure 320 is updated for responding to future passenger inputs.

Figure 4C:
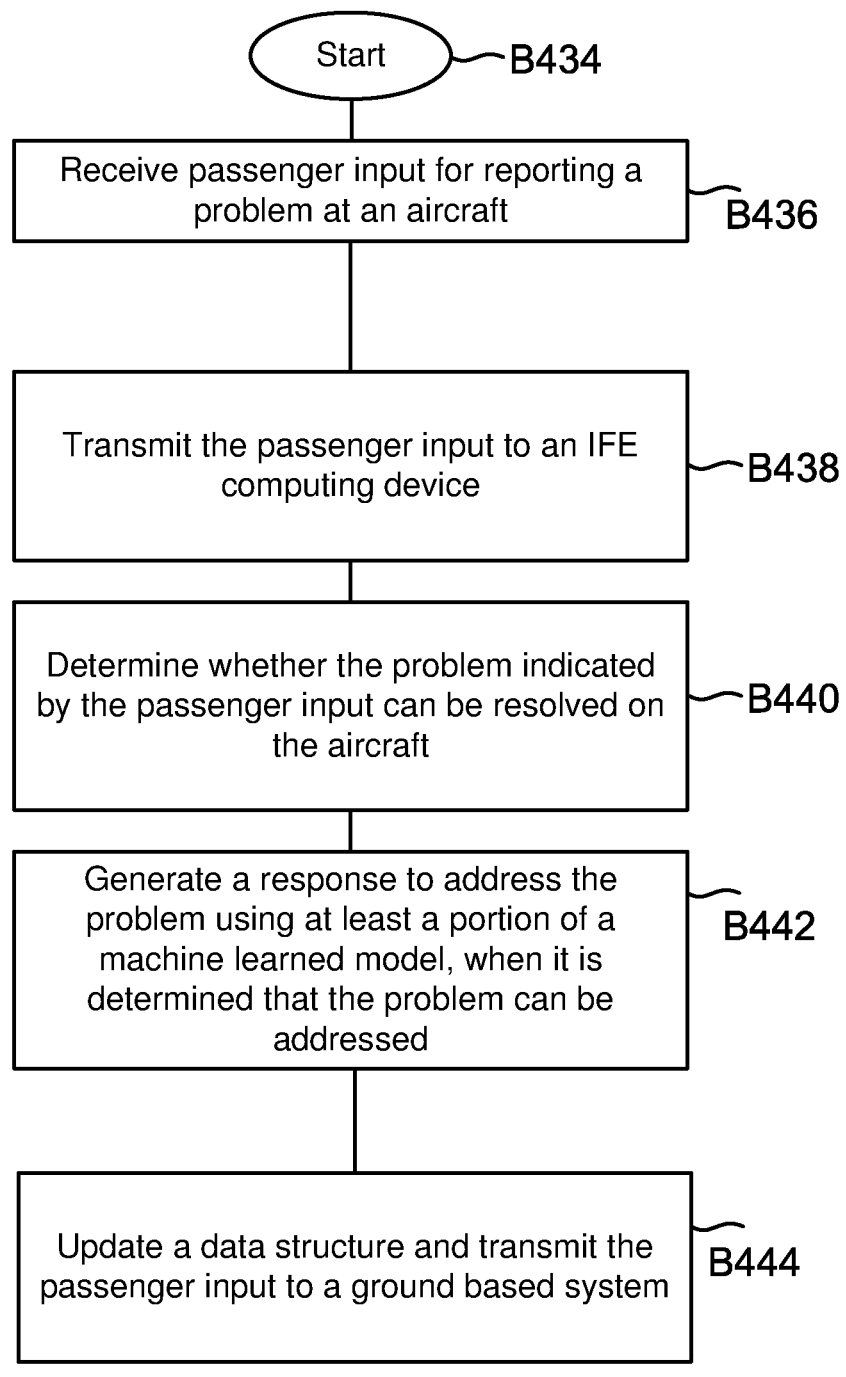
FIG. 4C shows a process flow diagram for maintaining systems and devices at an aircraft, according to one aspect of the present disclosure.

FIG. 4C shows a process 432 using data structure 320 or a portion thereof, according to one aspect of the present disclosure. Process 432 begins in block B434, when PED 302, seat device 326 and server 354 have been initialized and operational.

In block B436, a passenger reports a problem associated with an aircraft. The passenger input may be received by PED 302 and/or seat device 326. When the passenger input is received via PED 302, then the input is transmitted to a seat device 326 that sends the input to server 354, in block B438. The seat device 326 may be paired or associated with the PED 302. If the input is received via seat device 326, then the input is transmitted to the server 354. In yet another aspect, the input is transmitted from the PED 302 or seat device 326 to CMD 360.

In block B440, server 354 (or CMD 360) determines if the problem indicated by the passenger input can be resolved at the aircraft. Server 354 (or CMD 360) may use a portion of the machine learned, data structure 320 to make that determination. A response to the passenger input is generated in block B442, when it is determined that the problem can be addressed on the aircraft itself. The response may be generated by server 354 or CMD 360.

If the problem cannot be addressed, then in block B444, the server 354 (or CMD 360) updates a data structure (not shown) that maintains a list of items that have to be addressed on the ground. The user input is also transmitted in block B444, to a ground-based system to update the data structure 320. The ground based system can use the data structure 320 for maintaining and managing similar problems at other aircraft.

In one aspect, an innovative method is provided. The method includes receiving an input from a passenger of an aircraft at a PED (e.g., 302), indicating a problem at the aircraft, in which the PED is in communication with an in-flight entertainment (IFE) system computing device (e.g., server 354 or seat device 326); transmitting the input by the PED to the IFE system computing device; determining by the IFE computing device whether the problem identified by the input can be resolved at the aircraft. The IFE system computing device uses a portion of a machine learned model (e.g., 320) to evaluate whether the problem identified by the input can be resolved at the aircraft. The method further includes generating a response by the IFE system computing device to address the problem, when the evaluation indicates that the problem can be resolved at the aircraft; and transmitting the input from the aircraft to a ground computing system to address the problem after the aircraft has landed, when it is determined that the problem cannot be resolved at the aircraft.

Figure 4D:
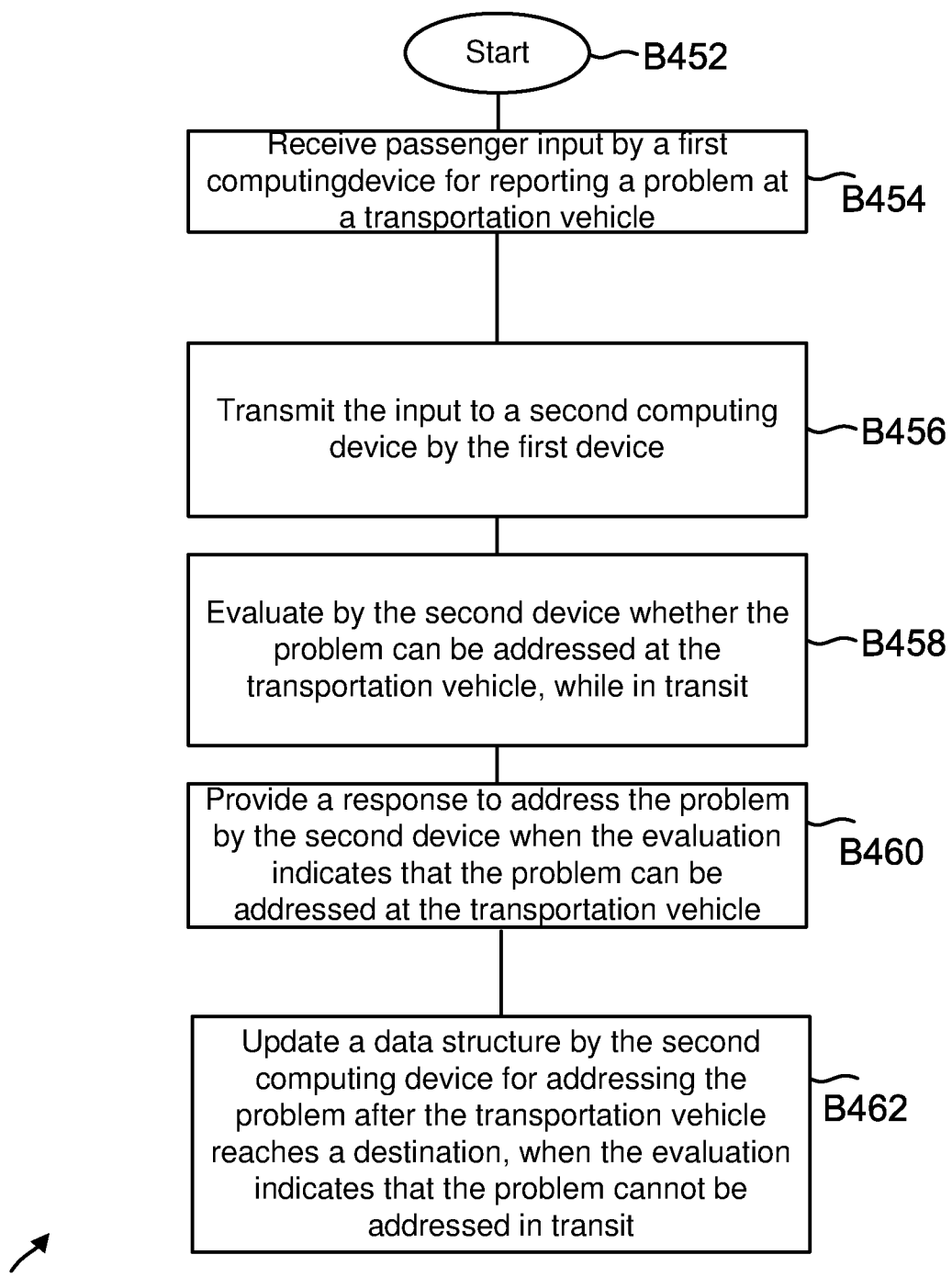
FIG. 4D shows another process flow diagram for maintaining systems and devices of a transportation vehicle, according to one aspect of the present disclosure.

FIG. 4D shows a process 450 in another aspect of the present disclosure. Process 450 begins in block B452. In block B454, an input from a passenger of a transportation vehicle is received by a first device (e.g., PED 302, seat device 326). The input reports a problem at the transportation vehicle. In block B456, the input is transmitted by the first device to a second device (e.g., server 354, seat device 326 or CMD 360). In block B458, the second device evaluates whether the problem identified by the input can be resolved at the transportation vehicle. The second device accesses a portion of a machine learned model (e.g., 320) to evaluate whether the problem identified by the input can be resolved at the transportation vehicle.

In block B460, a response is generated by the second device to address the problem, when the evaluation indicates that the problem can be resolved at the transportation vehicle. In block B462, the second device updates a data structure for addressing the problem after the transportation vehicle has reached a destination, when the evaluation indicates that the problem cannot be resolved at the transportation vehicle, while the vehicle is in transit.

Figure 5:
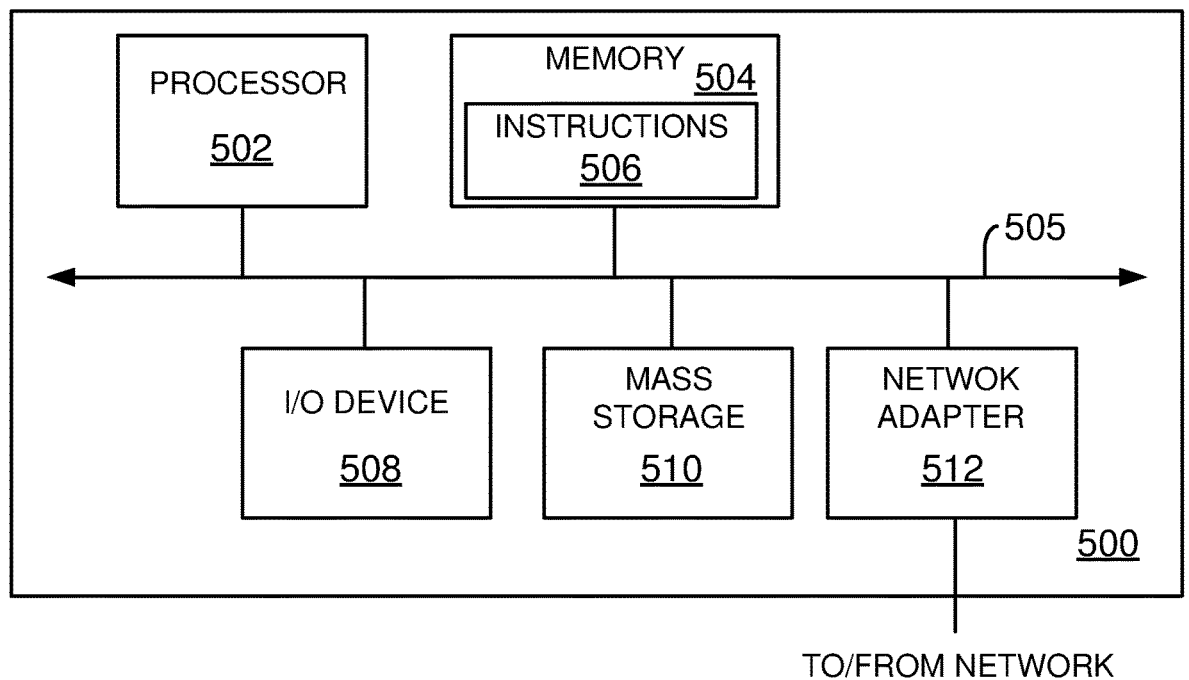
FIG. 5 shows a block diagram of a computing system, used according to one aspect of the present disclosure.

Processing System: FIG. 5 is a high-level block diagram showing an example of the architecture of a processing system 500 that may be used according to one aspect. The processing system 500 can represent a ground based computing system executing modules 382 and 386, CMD 360, media server 112, computing system 106, WAP 130, onboard management system 344, seat device 326 or any user device (PED 302) that attempts to interface with a vehicle computing device. Note that certain standard and well-known components which are not germane to the present aspects are not shown in FIG. 5.

The processing system 500 includes one or more processor(s) 502 and memory 504, coupled to a bus system 505. The bus system 505 shown in FIG. 5 is an abstraction that represents any one or more separate physical buses and/or point-to-point connections, connected by appropriate bridges, adapters and/or controllers. The bus system 505, therefore, may include, for example, a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire") or any other interconnect type.

The processor(s) 502 are the central processing units (CPUs) of the processing system 500 and, thus, control its overall operation. In certain aspects, the processors 502 accomplish this by executing software stored in memory 504. A processor 502 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

Memory 504 represents any form of random access memory (RAM), read-only memory (ROM), flash memory, or the like, or a combination of such devices. Memory 504 includes the main memory of the processing system 500. Instructions 506 may be used to implement modules 382 and 386, application 314, data structure 320 and/or the process steps of FIGS. 4A-4D described above.

Also connected to the processors 502 through the bus system 505 are one or more internal mass storage devices 510, and a network adapter 512. Internal mass storage devices 510 may be, or may include any conventional medium for storing large volumes of data in a non-volatile manner, such as one or more magnetic or optical based disks, flash memory, or solid-state drive.

The network adapter 512 provides the processing system 500 with the ability to communicate with remote devices (e.g., over a network) and may be, for example, an Ethernet adapter or the like.

The processing system 500 also includes one or more input/output (I/O) devices 508 coupled to the bus system 505. The I/O devices 508 may include, for example, a display device, a keyboard, a mouse, etc. The I/O device may be in the form of a handset having one or more of the foregoing components, such as a display with a real or virtual keyboard, buttons, and/or other touch-sensitive surfaces.

Thus, methods and systems for using crowd sourcing for maintaining devices on transportation vehicles have been described. Note that references throughout this specification to "one aspect" (or "embodiment") or "an aspect" mean that a particular feature, structure or characteristic described in connection with the aspect is included in at least one aspect of the present disclosure. Therefore, it is emphasized and should be appreciated that two or more references to "an aspect" or "one aspect" or "an alternative aspect" in various portions of this specification are not necessarily all referring to the same aspect. Furthermore, the particular features, structures or characteristics being referred to may be combined as suitable in one or more aspects of the disclosure, as will be recognized by those of ordinary skill in the art.

While the present disclosure is described above with respect to what is currently considered its preferred aspects, it is to be understood that the disclosure is not limited to that described above. To the contrary, the disclosure is intended to cover various modifications and equivalent arrangements within the spirit and scope of the appended claims.

What is claimed is:

1. A method, comprising:
   receiving by a first device, an input from a passenger of a transportation vehicle, the input reporting a problem at the transportation vehicle
   transmitting the input by the first device to a second device;
   evaluating by the second device whether the problem identified by the input is to be resolved at the transportation vehicle; wherein the second device accesses a portion of a machine learned model to evaluate whether the problem identified by the input is to be resolved at the transportation vehicle;

generating a response by the second device to address the problem, when the evaluation indicates that the problem can be resolved at the transportation vehicle; and updating a data structure by the second device for addressing the problem after the transportation vehicle has reached a destination, when the evaluation indicates that the problem cannot be resolved at the transportation vehicle.

2. The method of claim 1, further comprising:

forwarding the input to a third computing device remote to the transportation vehicle; and updating the machine learned model by the third computing device, based on the input.

3. The method of claim 2, wherein the third computing device uses the input to update a training dataset of the machine learned model.

4. The method of claim 1, wherein the machine learned model is used to generate a predictive response for the input for predicting failure of a device of the transportation vehicle.

5. The method of claim 1, wherein the machine learned model is used to generate a preventive response for the input to prevent failure of a device of the transportation vehicle.

6. The method of claim 1, wherein the machine learned model is used to generate a prescriptive response for a device of the transportation vehicle.

7. The method of claim 1, wherein the transportation vehicle is one of an aircraft, a train, a ship and a bus.

8. A method, comprising:

receiving an input from a passenger of an aircraft at a passenger electronic device (PED), indicating a problem at the aircraft, the PED being in communication with an in-flight entertainment (IFE) system computing device;

transmitting the input by the PED to the IFE system computing device;

determining by the IFE computing device whether the problem identified by the input can be resolved at the aircraft; wherein the IFE system computing device uses a portion of a machine learned model to evaluate whether the problem identified by the input can be resolved at the aircraft;

generating a response by the IFE system computing device to address the problem, when the evaluation indicates that the problem can be resolved at the aircraft; and transmitting the input from the aircraft to a ground computing system to address the problem after the aircraft has landed, when it is determined that the problem cannot be resolved at the aircraft.

9. The method of claim 1, further comprising:

updating a training dataset and the machine learned model by the ground computing device, based on the input.

10. The method of claim 1, wherein the PED transmits the input to a crew member device in communication with the IFE system and the crew member device makes the determination whether the problem identified by the input can be resolved at the aircraft.

11. The method of claim 10, wherein the crew member device transmits an explanation for the problem to the PED.

12. The method of claim 10, wherein the crew member device transmits a solution to the PED to mitigate the problem.

13. The method of claim 8, wherein the machine learned model is used to generate a predictive response for the input for predicting failure of a device of the aircraft.

14. The method of claim 1, wherein the machine learned model is used to generate a preventive response for the input to prevent failure of a device of the aircraft.

15. A non-transitory machine readable medium having stored thereon instructions for performing a method comprising machine executable code which when executed by at least one machine, causes the machine to:

receive an input from a passenger of an aircraft at a passenger electronic device (PED), indicating a problem at the aircraft, the PED being in communication with an in-flight entertainment (IFE) system computing device;

transmit the input by the PED to the IFE system computing device;

determine by the IFE computing device whether the problem identified by the input can be resolved at the aircraft; wherein the IFE system computing device uses a portion of a machine learned model to evaluate whether the problem identified by the input can be resolved at the aircraft;

generate a response by the IFE system computing device to address the problem, when the evaluation indicates that the problem can be resolved at the aircraft; and transmit the input from the aircraft to a ground computing system to address the problem after the aircraft has landed, when it is determined that the problem cannot be resolved at the aircraft.

16. The storage medium of claim 15, wherein the machine executable code further causes the machine to:

update a training dataset and the machine learned model by the ground computing device, based on the input.

17. The storage medium of claim 15, wherein the PED transmits the input to a crew member device in communication with the IFE system and the crew member device makes the determination whether the problem identified by the input can be resolved at the aircraft.

18. The storage medium of claim 17, wherein the crew member device transmits an explanation for the problem to the PED.

19. The storage medium of claim 17, wherein the crew member device transmits a solution to the PED to mitigate the problem.

20. The storage medium of claim 15, wherein the machine learned model is used to generate a predictive response for the input for predicting failure of a device of the aircraft.

* * * * *